United States Patent
Huston et al.

(10) Patent No.: US 7,765,032 B2
(45) Date of Patent: Jul. 27, 2010

(54) SYSTEMS COMPRISING A MECHANICALLY ACTUATED MAGNETIC ON-OFF ATTACHMENT DEVICE

(75) Inventors: Dryver R. Huston, S. Burlington, VT (US); Brian Esser, Colchester, VT (US); James O. Plumpton, Burlington, VT (US)

(73) Assignee: The University of Vermont and State Agricultural College, Burlington, VT (US)

( * ) Notice: Subject to any disclaimer, the term of this patent is extended or adjusted under 35 U.S.C. 154(b) by 1534 days.

(21) Appl. No.: 11/080,921

(22) Filed: Mar. 15, 2005

(65) Prior Publication Data
US 2005/0216125 A1    Sep. 29, 2005

Related U.S. Application Data

(60) Provisional application No. 60/553,158, filed on Mar. 15, 2004.

(51) Int. Cl.
G05B 15/00    (2006.01)
B62D 51/06    (2006.01)
H01H 56/30    (2006.01)
(52) U.S. Cl. .................... 700/258; 180/8.6; 180/8.3; 180/164; 361/160
(58) Field of Classification Search ................ 700/258; 180/8.6, 8.3, 164; 361/160
See application file for complete search history.

(56) References Cited

U.S. PATENT DOCUMENTS

| 2,280,437 | A |   | 4/1942 | Levesque | 175/367 |
| 4,777,416 | A | * | 10/1988 | George et al. | 318/568.12 |
| 4,792,870 | A | * | 12/1988 | Pinson | 360/78.14 |
| 5,551,525 | A | * | 9/1996 | Pack et al. | 180/8.6 |
| 5,890,553 | A | * | 4/1999 | Bar-Cohen et al. | 180/8.1 |
| 6,186,480 | B1 | * | 2/2001 | Leteurtre | 254/84 |
| 6,246,307 | B1 | * | 6/2001 | Friedman | 335/205 |
| 6,276,478 | B1 | * | 8/2001 | Hopkins et al. | 180/164 |
| 6,285,971 | B1 | * | 9/2001 | Shah et al. | 703/2 |
| 6,567,711 | B1 | * | 5/2003 | Hosek et al. | 700/55 |
| 6,691,811 | B2 | * | 2/2004 | Bruntrup et al. | 180/164 |
| 6,793,026 | B1 | * | 9/2004 | De Fazio | 180/8.3 |
| 7,248,951 | B2 | * | 7/2007 | Hulden | 701/23 |

(Continued)

OTHER PUBLICATIONS

Neptune: Above ground storage tank inspection robot system; Robotics and Automation, 1994. Proceedings. 1994 IEEE International Conference.*

(Continued)

*Primary Examiner*—Khoi Tran
*Assistant Examiner*—Ian Jen
(74) *Attorney, Agent, or Firm*—Downs Rachlin Martin PLLC (57) ABSTRACT

A magnetic on-off robotic attachment device (MOORAD) (100, 300, 400, 624, 624', 660, 676, 804) is used to make a number of systems, such as a mobile apparatus (608, 644, 668, 700, 700'), a belt mechanism (800) and a sensor device (504, 508, 656). The MOORAD allows the respective system to be removably magnetically attached to a ferromagnetic structure/object (228, 420, 604, 604', 720A-B, 720A'-B', 848). Each MOORAD generally includes a dipole magnet (104, 304A-B, 404) movable relative to first and second ferromagnetic portions (112, 116, 316A-D, 408, 412) that are separated by corresponding magnetically insulating portions (120, 320A-C, 416) so as to change that MOORAD between off and on states.

15 Claims, 5 Drawing Sheets

U.S. PATENT DOCUMENTS

| | | | |
|---|---|---|---|
| 7,520,356 B2* | 4/2009 | Sadegh et al. | 180/164 |
| 2006/0023390 A1* | 2/2006 | Spurr et al. | 361/160 |
| 2006/0071577 A1* | 4/2006 | Takeuchi | 310/268 |
| 2008/0308324 A1* | 12/2008 | Moser et al. | 180/6.7 |
| 2009/0033169 A1* | 2/2009 | Takeuchi | 310/156.32 |
| 2009/0058130 A1* | 3/2009 | Ukpai et al. | 296/146.9 |

OTHER PUBLICATIONS

NPL: Adaptive, Robotic and Mobile Sensor systems for Structural Assessment.*

Bar-Cohen, Y (2002), "Biologically Inspired Robots as Artificial Inspectors", *E-Journal of Nondestructive Testing*, vol. 7, No. 1, Jan. 2002.

Galbreath, J.H., Townsend, C.P., Mundell, S.W., Hamel, M.J., Esser, B., Huston, D.R., and Arms, S.W. (2003), "Civil Structure Monitoring with Power-Efficient, High Speed Wireless Sensor Networks." *Proc. 4th IWSHM (International Workshop on Structural Health Monitoring)*, Stanford, CA, September.

Geim, A.K., Dubonos, S.V., Grigorieva, I.V., Novoselov, K.S., Zhukov, A.A., and Shapoval, S.Y. (2003), "Microfabricated adhesive mimicking gecko foot-hair", Nature Materials, vol. 2. Jul. 2003.

Hudson, K (2000), "Lab VIEW-Controlled Robot Climbs and Inspects Highway Lighting Towers", *LabVIEW Customer Solutions*.

Huston, D.R., Esser, B., Miller, J. and Wang, Z (2003), "Robotic and Mobile Sensor Systems for Structural Health Monitoring", *Proc. 4th IWSHM (International Workshop on Structural Health Monitoring)*, Stanford, CA, September.

Johnson, T.J., Brown, R.L. Adams, D.E., and Schiefer, M. (2004), "Distributed structural health monitoring with a smart sensor array", *Mechanical Systems and Signal Processing*, vol. 18, Issue 3, pp. 555-572.

Moon, F.C. (1984) *Magneto-Solid Mechanics*, John Wiley and Sons, New York, NY.

Schempf, H (1994), "NEPTUNE: Aboveground Storage-Tank Inspection Robot System", *Proc. IEEE Int. Conf. on Robotics and Automation*, May.

Sclater, N and Chironis, N.P. (2001), *Mechanisms and Mechanical Devices Sourcebook, Third Edition*, McGraw-Hill, New York, NY.

Taubes, G. (2000), "Biologists and Engineers Create a New Generation of Robots that Imitate Life", *Science*, vol. 288 Issue 5463.

F. Chang, *Structural Health Monitoring 2003*. DEStech Publications, Lancaster, PA 2003.

* cited by examiner

SYSTEMS COMPRISING A MECHANICALLY ACTUATED MAGNETIC ON-OFF ATTACHMENT DEVICE

RELATED APPLICATION DATA

This application claims the benefit of priority of U.S. Provisional Patent Application Ser. No. 60/553,158, filed Mar. 15, 2004, and titled "On-Off Magnetic Attachment Device," that is incorporated by reference herein in its entirety.

FIELD OF THE INVENTION

The present invention generally relates to the field of removably attachable devices. In particular, the present invention is directed to systems comprising a mechanically actuated magnetic on-off attachment device.

BACKGROUND OF THE INVENTION

Structural Health Monitoring (SHM) is vital to ensuring the integrity and longevity of civil structures, as well as providing data and design feedback for the modification or retrofit of existing structures, or the construction of new structures. By observing the performance and state of a structure through SHM techniques, much information can be obtained which quantify how a structure responds to its real world environment and its present state of health. Although computer simulations and analyses can predict a structural response to various loading conditions and environmental parameters, it is also important to monitor the performance of the structure during its construction and throughout its life. SHM gives key information regarding structural condition and capabilities, provides feedback to help validate or invalidate the design models, highlights factors neglected in the modeling process and provides insight into the condition and lifespan of structures. SHM also provides invaluable information for determining maintenance schedules and upkeep requirements.

However, even with all the benefits SHM has to offer, the size, complexity, and accessibility of the structures themselves often makes monitoring difficult or impossible with conventional human-based monitoring techniques. The use of mobile robots to deploy sensors and gather data in SHM applications provides alternatives to human-based systems and greatly increases the feasibility of employing SHM in many hazardous, confined, or inaccessible structures or structural components.

Perhaps the most significant challenge to creating a robot platform for SHM applications is the diversity and variability of the structures themselves. Aside from creating small, specialized robots designed to travel across a single structure, or even a single aspect of a structure, utilization of robotics in SHM has been extremely limited. However, by creating a robotic platform which has the ability to traverse a wide variety of configurations and geometric complexities, robots can be applied to SHM of many different structures with only a few robotic platform configurations.

Many civil structures are made from ferromagnetic materials, predominantly steel. Being of major importance to civil infrastructure, monitoring of the health of these systems is critical. Typical examples of structures which can benefit from SHM include bridges, coffer dams, pipelines, power stations, transmission towers, water towers, radio towers, construction sites, skyscrapers, offshore oil platforms, and many others.

Employing sensor nodes and networks for gathering data for SMH is not a new idea. Numerous specialized robots have been constructed for specific structures; however, these robots are generally limited in mobility and cannot be used on a variety of structure configurations. Instead, they are designed for single applications to a specific structure. Such robots include utility pole climbers and I-beam traversing units. A robot known as "The Robotic Inspector," or RobIn, was developed at the Intelligent Robotics Lab at Vanderbilt University to inspect manmade structures. RobIn is highly mobile and versatile, but is restricted by limited payload areas and a power cord. Visual/Inspection Technologies Inc. has a unit called "SPOT" that utilizes movable cameras for pipe inspection and has developed other robotic systems. Although SPOT can travel into areas where humans cannot reach, it still requires a human operator and is specific to piping applications.

Other robots for pipe specific applications have been developed at North Carolina State University. Their proposed use is to crawl through pipes that remain intact after a building collapse and search for survivors trapped in the wreckage. They can also be used to detect gas leaks. However, a robot platform which has the capability to traverse a wide variety of structural and geometric configurations would add considerable versatility to a robotic SHM application. To create such a robot, a novel technique for attachment to the structure is needed to avoid designs based upon tracks or specialized mechanical gripping.

Biologically inspired robots have been widely praised as having many features desirable in an automated platform, and rely on locomotion techniques which have endured millennia of testing and refinement through the evolutionary process. Creating a biologically inspired robot results in an effective platform of locomotion, however the means by which the robot physically attaches to the structure is still in question. A promising advancement in this field recently has been the development of a gecko-foot like material which utilizes van der Waals forces to cling to smooth surfaces, in the same way as the gecko lizard is able to walk up a glass window. This material can grip non-magnetic surfaces, but disengaging its grip remains problematic. Also, its use and reuse on rough or scaly surfaces is severely limited. Other attachment efforts have utilized electromagnets, and have even included non-switchable permanent magnet tracks for the inspection of underground storage tanks.

SUMMARY OF THE INVENTION

In one aspect, the present invention is directed to a magnetic on-off attachment device. The device comprises a first ferromagnetic portion, a second magnetic portion and a magnetic insulator magnetically isolating the first ferromagnetic portion from the second magnetic portion. A dipole magnet is movable relative to each of the first and second ferromagnetic portions. An actuating mechanism is operatively coupled to the dipole magnet so as to move the dipole magnet relative to each of the first and second ferromagnetic portions in response to an actuating signal so as to alternatingly switch the magnetic device between an on state and an off state.

In another aspect, the present invention is directed to a mobile apparatus system. The system comprises a chassis and a mobility system attached to the chassis. The mobility system comprises a plurality of magnetic on-off robotic attachment devices each having an on state and an off state and including a first actuator for switching between the on state and the off state. The mobility system further includes at least one second actuator for moving at least one of the plurality of magnetic on-off robotic attachment devices relative to the chassis in response to a signal.

In a further aspect, the present invention is directed to a mobile apparatus system. The system comprises an articulated chain comprising a plurality of magnetic on-off robotic attachment units and a controllable articulated linkage linking pairs of adjacent ones of the plurality of magnetic on-off robotic attachment units with each other.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Referring now to FIGS. 1A-1D, there is shown in accordance with the present invention a mechanical on-off robotic attachment device (MOORAD), which is generally indicated by the numeral 100. As will become readily apparent from reviewing the entire present disclosure, a MOORAD of the present invention, such as MOORAD 100, has numerous applications, some of which are shown and described herein, some of which are mentioned herein and some of which those skilled in the art will recognize after reviewing this disclosure. For example, a MOORAD of the present invention may be used: 1) in connection with mobility systems of mobile apparatuses designed to have mobility on ferromagnetic structures, such as robots, autonomous navigation vehicles, tethered and untethered telemetry controlled vehicles, etc.; 2) as attachment devices for releasably securing items to ferromagnetic structures and 3) in connection with moving ferromagnetic items from one location to another, among others. One or more examples of each one of these applications are described below.

Broadly speaking, MOORAD 100 includes a dipole magnet 104 rotatably mounted within a special housing 108. As explained in detail below, dipole magnet 104 is rotatable between a first position 112 and a second position 116 corresponding to, respectively, an off, i.e., magnetically deactivated, state and an on, i.e., magnetically activated, state. When dipole magnet 104 is a permanent magnet, MOORAD 100 has the beneficial feature that it only requires power to switch states, not to maintain them. This is in sharp contrast to conventional electromagnetic attachment devices (not shown), which must constantly draw electrical current to maintain a magnetic field. Rotation of dipole magnet 104 can be effected using an actuating mechanism 120, which may be any of a variety of actuating mechanisms that includes any of a wide variety of components, such as linkages, gear trains, servomotors and many others. Because power is only required when switching states, engagement of MOORAD 100 in contact with a ferromagnetic structure (not shown) is a neutrally stable change of states. The attachment can be sustained indefinitely without additional energy. For example, a mobile apparatus (not shown) supported by MOORAD 100 can hang suspended from a structure ad infinitum without consuming power. Similarly, sensors can be positioned and attached to ferromagnetic structures and, therefrom, can monitor various physical occurrences for an amount of time limited only by the power schemes of the sensors and their microelectronics (including any data transmission). This enables structures to be monitored for long periods of time by small, relatively simple platforms.

Figure 2:
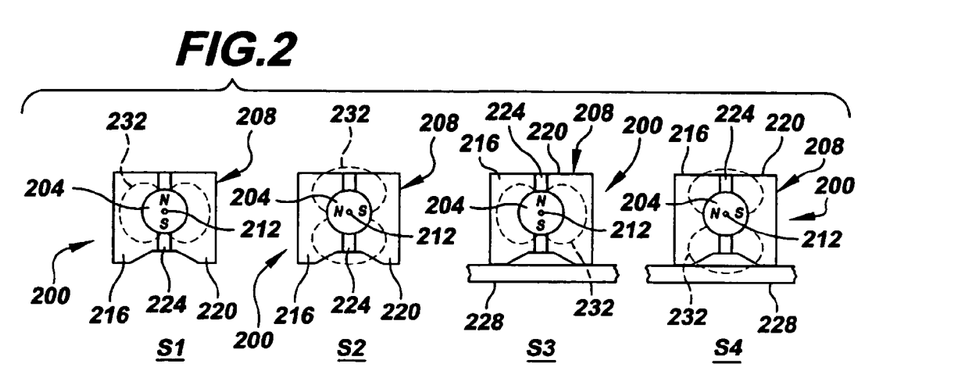
FIG. 2 is a schematic diagram illustrating the four primary states of a MOORAD of the present invention.
Figure 3A:
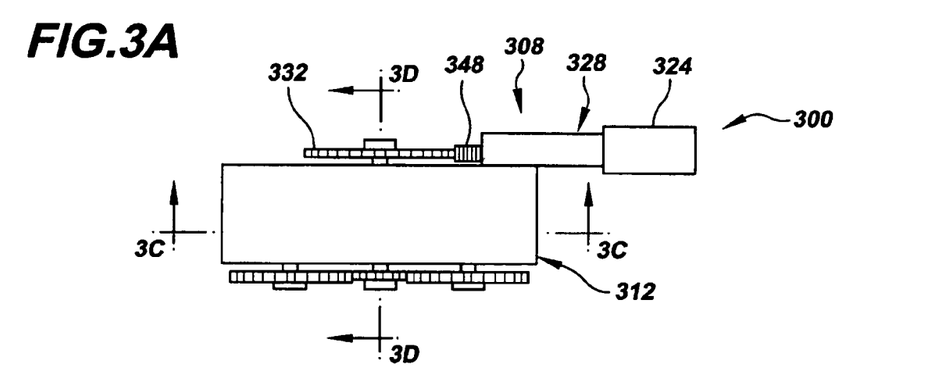
FIG. 3A is a plan view of an alternative MOORAD of the present invention having two permanent magnets.
Figure 3B:
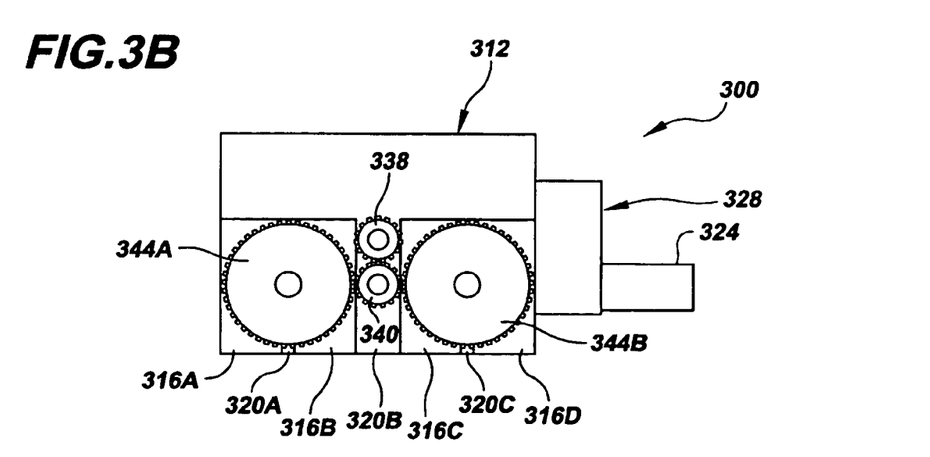
FIG. 3B is an elevational view of the front side of the MOORAD of FIG. 3A.
Figure 3C:
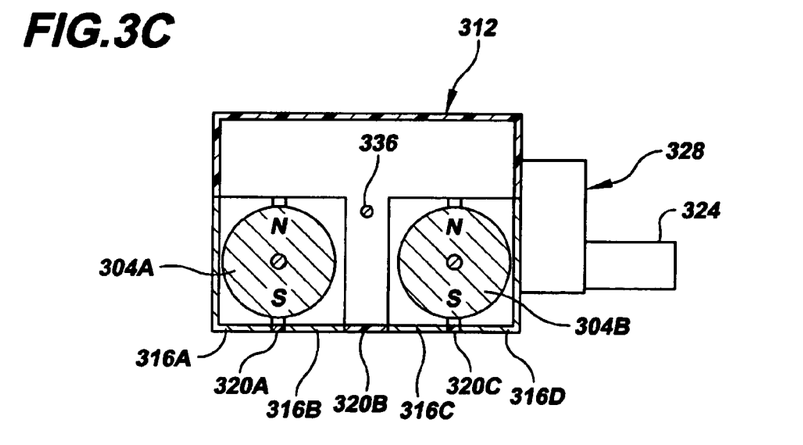
FIG. 3C is a cross-sectional view as taken along line 3C-3C of FIG. 3A.
Figure 3D:
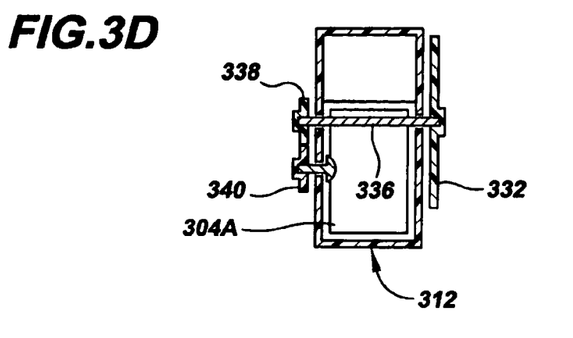
FIG. 3D is a cross-sectional view as taken along line 3D-3D of FIG. 3A.

The underlying principles of operation of MOORAD 100 specifically and, more generally, any MOORAD of the present invention are briefly described in connection with FIG. 2. FIG. 2 illustrates the four primary states S1, S2, S3, S4 of a mechanically actuated magnetic on-off device 200 that includes a dipole magnet, in this case a cylindrical permanent dipole magnet 204, contained in a housing 208. Magnet 204 is rotatable within housing 208 about a rotational axis 212 either manually, or automatically using an actuator (not shown). In the embodiment of FIG. 2, housing 208 is a "split" housing, comprising first and second portions 216, 220 made of a ferromagnetic material separated by a third portion 224 made of a magnetic insulating material. Rotatable magnet 204 and housing 208 create a mechanically switchable permanent magnet circuit. Magnet 204 and housing 208 become an effective gripper when attachment device 200 is placed near to or in contact with a ferromagnetic object, such as object 228.

By rotating magnet 204 through 90 degrees, the magnetic force available for attachment device 200 to attach to object 228 may be varied from a maximum to minimum amount, depending upon the locations of the north (N) and south (S) poles of the magnet relative to the object. Depending on the rotational position of magnet 204 relative to housing 208 and whether attachment device 200 is in contact with object 228, the attachment device may be in one of four different states, i.e., states S1-S4 of FIG. 2. As those skilled in the art will readily appreciate, the north N and south S poles may be reversed without materially affecting the four states S1-S4.

Rotating magnet 204 about rotational axis 212 through 90 degrees switches attachment device 200 between two states-on and off, i.e., respectively, states S2 and S1. Placing attachment device 200 on or off the surface of object 228 switches the attachment device between two more states, i.e., states S3 and S4. The combination of the two sets of two states each gives four possible states S1-S4. State S1 is a low energy state in which the magnetic flux lines 232 are all contained in magnet 204 and housing 208. State S2 is a high-energy state in which magnet 204 is rotated 90 degrees relative to state S1 and magnetic flux lines 232 are forced through the air above and below housing 208. State S3 is a low-energy state. State S3 is similar to state S1 in that magnetic flux 232 lines are contained entirely within attachment device 200. The difference between state S1 and state S3 is that attachment device 200 is placed in contact with, or in close proximity to, surface of object 228. State S4 is a low-energy state that is similar to state S3 except that magnet 204 has been switched 90 degrees so that magnetic flux lines 232 flow out of housing 208 and through object 228.

Switching from a low energy state (S1, S3 or S4) to a high-energy state (S2) requires mechanical energy. Switching from state S1 to state S2 requires significant torque to turn magnet 204. Switching from state S3 to state S2 requires going through state S1 and requires significant torque to turn magnet 204. Switching from state S4 to state S2 requires substantial force to pull attachment device 200 from ferromagnetic object 228. This explains why attachment device 200 is firmly attached to ferromagnetic object 228 in state S4. Switching from a high-energy state (S2) to a low-energy state (S1, S3 or S4) produces excess energy that could, in principle, be recovered, but almost always is lost eventually in the form of heat to the environment.

Switching between the low-energy states (S1, S3 and S4) requires much less energy than switching to a high-energy state. The required energy is used almost entirely to overcome friction and the hysteresis of magnetization in the ferromagnetic materials. The operation of a mechanically actuated magnetic on-off device, such as attachment device 200 or MOORAD 100 of FIG. 1, typically involves switching from state S1 to state S3 to state S4 for attachment and from state S4 to state S3 to state S1 for removal. A sliding and gripping mode of operation would switch from state S3 to state S4 for gripping and from state S4 to state S3 for release and sliding.

Switching of attachment device 200 among the four states S1-S4 requires two distinct actuations—one to rotate magnet 204 and one to move the attachment device closer to or away from ferromagnetic object 228. These two actuations may be accomplished by either manual or automated mechanical means. Machine actuation modes can include mechanical linkage, electrical/motor/servo rotation, or any combination of electromechanical actuation, including tele-operated and wireless remote control. It is also possible to design a mechanical linkage that engages magnet 204 upon contact with a surface of object 228.

With the basics of operation of a mechanically actuated magnetic on-off device now in mind, reference is again made to FIGS. 1A-1D. Housing may include first and second portions 124, 128 made of a ferromagnetic material, e.g., iron or steel, among others, and a third portion 132 made of a magnetically insulating material, such as plastic or ceramic, among others. Magnet 104 may be fixedly attached to an axle 136 that rotatably engages housing 108. Actuating mechanism 120 may comprise one or more components operatively connected to magnet 104, e.g., via axle 136, for rotating the magnet between its first and second positions 112, 116. In the present embodiment, actuating mechanism 120 includes a lever arm 140 and a linear actuator 144 operatively connected to the lever so as to pivot the lever between first and second positions 148, 152 corresponding to, respectively, the off position 112 and on position 116 of magnet 104 that are generally 90° apart from one another. Actuating mechanism 120 may be responsive to an appropriate control signal 156 that causes the switching of states to occur. Control signal 156 may be virtually any type of signal, such as an electrical signal, pneumatic signal, hydraulic signal, sonic or ultrasonic signal or optical signal, among others.

Linear actuator 144 may be any suitable type of actuator, such as a pneumatic piston/cylinder arrangement, hydraulic piston/cylinder arrangement or rack and pinion arrangement, among others. Again, actuating mechanism 120 may comprise any one or more of other types of components, such as gears, servo motors, direct drive motors, or any other suitable component. Several variations of actuating mechanisms are described below in connection with other embodiment. Even so, those skilled in the art will readily understand that the various examples of an actuating mechanism disclosed herein are by no means exhaustive, but rather merely illustrative. Skilled artisans will undoubtedly be able to fashion many other actuating mechanisms without undue experimentation.

FIGS. 3A-3D illustrate another MOORAD 300 of the present invention. MOORAD 300 is generally similar to MOORAD 100 of FIGS. 1A-1D, except that MOORAD 300 of FIGS. 3A-3D includes two dipole magnets, and more particularly, two cylindrical permanent dipole magnets 304A-B, and a motorized gear type actuating mechanism 308 in lieu of, respectively, non-cylindrical dipole magnet 104 and linear actuator type actuating mechanism 120 of FIGS. 1A-1D. Each of the two cylindrical magnets 304A-B are rotatable mounted in a split housing 312 comprising a plurality of ferromagnetic portions 316A-D interdigitated with a plurality of magnetically insulating portions 320A-C. The choice of the number of magnets 304 may be driven by the strength of the magnets available, the design holding force and/or footprint of MOORAD 300 needed for a particular application, among other things. It is a largely straightforward matter to provide MOORAD 300 with only one magnet on one hand, or three, thirty or three-hundred magnets on the other hand. As with MOORAD 100 of FIGS. 1A-1D, the respective portions 316, 320 of housing 312 may be made of any suitable ferromagnetic or magnetically insulating material.

Figure 1A:
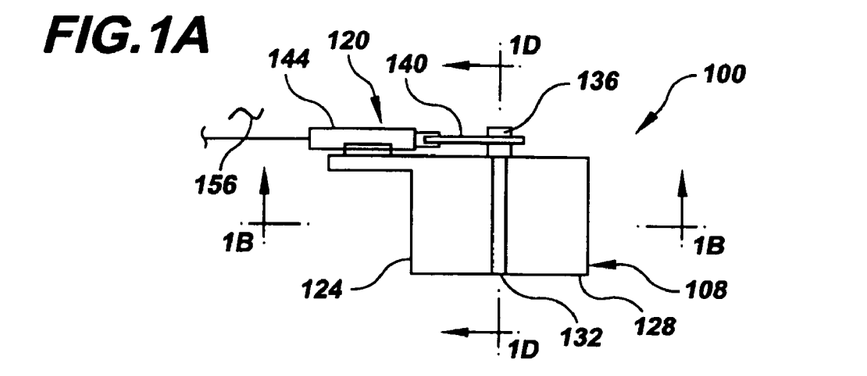
FIG. 1A is a plan view of a mechanical on-off robotic attachment device (MOORAD) of the present invention.
Figure 1B:
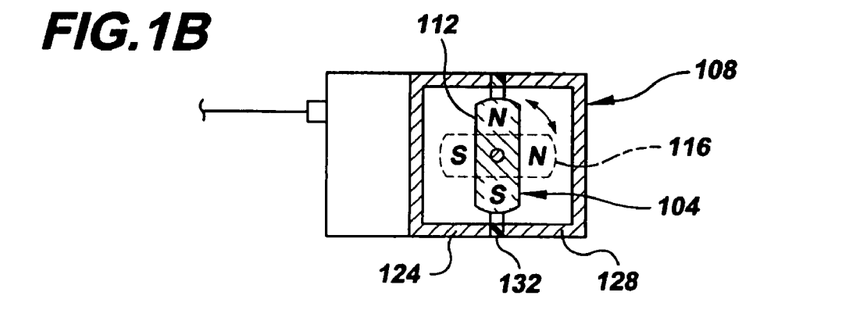
FIG. 1B is a cross-sectional view as taken along line 1B-1B of FIG. 1A.
Figure 1C:
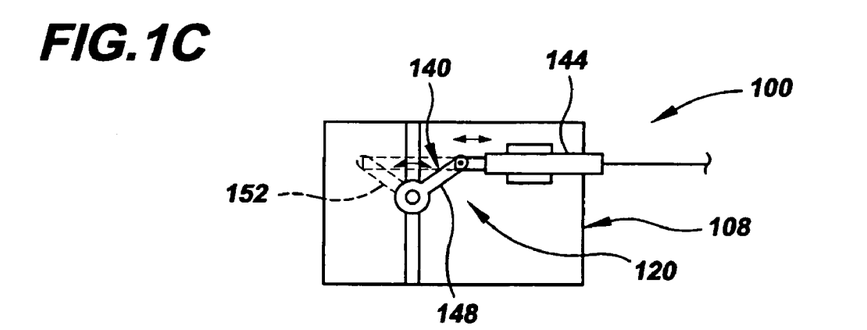
FIG. 1C is an elevational view of the back side of the MOORAD of FIG. 1A.
Figure 1D:
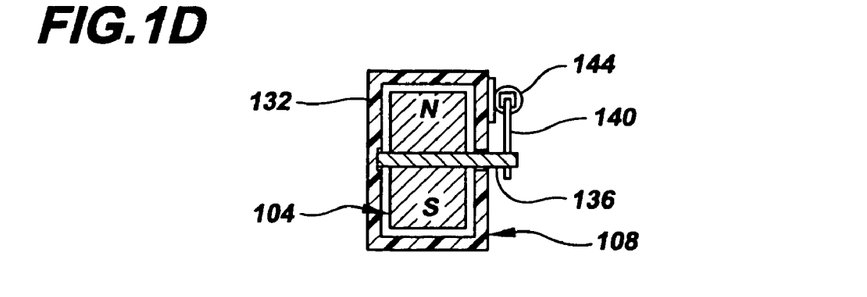
FIG. 1D is a cross-sectional view as taken along line 1D-1D of FIG. 1A.

In the present embodiment, actuating mechanism 308 includes a servomotor 324, a gearbox 328, several external gears 332, 338, 340, 344 and a shaft 336 for transferring power from the gearbox to each of cylindrical magnets 304A-B for rotating the magnets between their on and off positions, which like magnet 104 of FIGS. 1B and 1D, are generally 90° apart from each other. Gearbox 328 includes a main drive gear 348, which enmeshes with a relatively large diameter transfer gear 332, which transmits power from the main drive gear to transfer shaft 336, which transfers power to a relatively small diameter transfer gear 338, which enmeshes with a spur gear 340 located on the side of MOORAD 300 opposite the transfer gear. Spur gear 340 enmeshes with two magnet drive gears 344A-B that correspond to, and drive the rotation of, the respective cylindrical magnets 304A-B. In the present embodiment, spur gear 340 and magnet drive gears 344A-B are designed so that a full rotation of the spur gear causes a one-quarter rotation of each of magnet drive gears. Consequently, a full rotation of spur gear 340 is needed to change MOORAD 300 from its off position to its on position, or vice versa, depending upon the direction of rotation. The number of revolutions of the drive shaft (not shown) of servomotor and/or time that the servomotor 324 needs to be running in order to change the state of MOORAD 300 can be determined once all of the gear ratios are known. As those skilled in the art will readily appreciate, the particular gearing shown is merely exemplary and that the gearing and drive-configuration possibilities are virtually limitless. However, once design parameters have been determined, e.g., required speed of operation, required power, power and speed of servomotor 324, etc., skilled artisans will have no problem designing an appropriate drive system.

Utilizing a MOORAD of the present invention has many advantages over conventional electromagnets. As mentioned, once engaged a MOORAD of the present invention is stable and consumes no power to remain attached. This not only is attractive in terms of operating time, efficiency, and onboard power requirements, but also improves safety by reducing the chances of the item supported by the MOORAD, e.g., a mobile apparatus or sensor, detaching unexpectedly. One embodiment of "double" MOORAD 300 of FIGS. 3A-3D required approximately 110 mA of current to actuate at a potential of 5 V, taking about 1.75 seconds. This resulted in a power requirement of 550 mW, consuming just 960 mJ of energy for each change of states (off to on, or on to off). A commercial electromagnet of similar scale (not shown) was investigated for comparison. This conventional electromagnet drew 330 mA at 12 V, consuming 4 W the entire time the electromagnet was attached to a ferromagnetic structure. The energy required to operate the electromagnet for just one minute could be used to switch the state of the prototype MOORAD 250 times.

Not only were the power requirements significantly less in the above-discussed embodiment of MOORAD 300 than in the electromagnet, but the holding force was superior as well. Tests of both devices were performed in an Instron testing machine to determine the maximum holding force of each device. The electromagnet was capable of providing an average of 60 N of magnetic attractive holding force when placed against a mild steel surface. This electromagnet has a mass of 77 g, therefore the force to mass ratio is approximately 0.78 N/g. The MOORAD 300 embodiment was capable of an average maximum force of 182 N. The mass of the unit, including the gear motor actuator, is 183 g, resulting in a force to mass ratio of 0.99 N/g. It is noted that the design of the MOORAD 300 embodiment was not optimized for minimum mass, and a MOORAD having similar holding power could be built with a significantly reduced weight. These tests clearly exhibit the advantages of MOORAD-based gripping over electromagnetic-based gripping in terms of both power requirements and force-to-weight ratio.

Figure 4A:
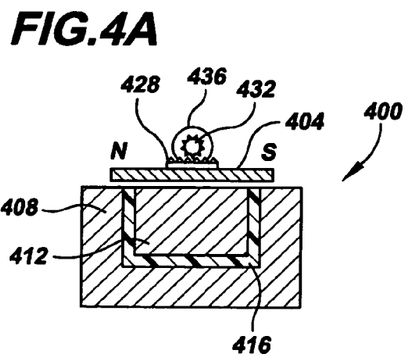
FIG. 4A is an elevational cross-sectional view of an alternative MOORAD of the present invention having a linearly movable dipole magnet showing the relative location of the magnet in the off state of the MOORAD.
Figure 4B:
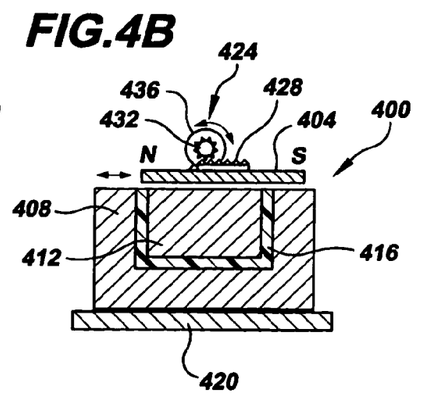
FIG. 4B is an elevational cross-sectional view of the MOORAD of FIG. 4A showing the relative position of the magnet in the on state of the MOORAD.

FIGS. 4A and 4B illustrate another MOORAD 400 of the present invention that is switchable between on and off states by moving a dipole magnet 404 linearly, rather than rotationally. MOORAD 400 includes a first ferromagnetic portion 408 and a second magnetic portion 412 separated from each other by magnetically insulating portion 416 in a manner generally similar to MOORADs 100, 300 described above relative to FIGS. 1A-1D and 3A-3D. In this case, however, second portion 412 is generally nested within first portion 408 and dipole magnet 404 is slidable along the upper (relative to FIGS. 4A and 4B) surfaces of the first and second portions. FIG. 4A illustrates the position of dipole magnet 404 relative to first and second portions 408, 412 such that MOORAD 400 is in its off state, i.e., the state in which the magnetic attraction of the MOORAD toward its lower surface is at a minimum. In the off state, dipole magnet 404 is located so that its opposing pole ends overlap first portion 408 by substantially the same amount. FIG. 4B, on the other hand, illustrates the position of dipole magnet 404 relative to first and second portions 408, 412 such that MOORAD 400 is in its on state, i.e., the state in which the magnetic attraction of the MOORAD toward its lower surface is at a maximum. The on state of FIG. 4A is the state that will create the strongest attachment to a ferromagnetic structure, such as structure 420. As with MOORADs 100, 300 of FIGS. 1A-1D and 3A-3D, dipole magnet 404 may be moved either manually or automatically using an actuating mechanism, such as actuating mechanism 424 shown. In this example, actuating mechanism 424 is a simple rack and pinion arrangement comprising a rack 428 attached to dipole magnet 404 and a pinion 432 driven by a motor 436 attached to MOORAD 400. However, as with MOORADs 100, 300 described above in connection with FIGS. 1A-1D and 3A-3D, actuating mechanism 424 can be virtually any suitable actuating mechanism.

Figure 5:
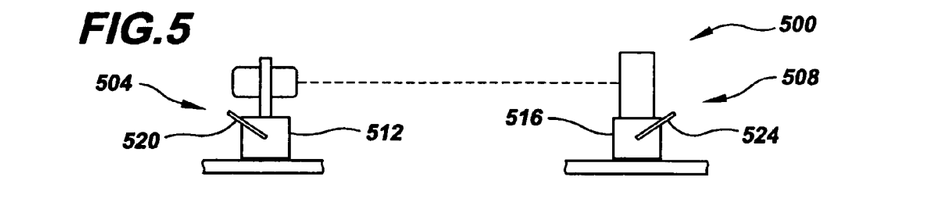
FIG. 5 is an elevational view illustrating a pair of sensing devices of the present invention that each include a MOORAD.

FIG. 5 illustrates a sensor system 500 of the present invention that includes first and second sensor devices 504, 508, each supported by a corresponding respective MOORAD 512, 516. Each sensor device 504, 508 may be any device capable of sending, receiving, reflecting, refracting, generating etc. a signal and/or measuring a phenomenon, or physical occurrence, that is desired to be measured or monitored. Examples of such devices include, but are not limited to, video, audio, ultrasonic temperature, humidity, acceleration, strain, GPS, CBN detectors, and miniature mass spectrometers. Each MOORAD 512, 516 may include one or more dipole magnets (not shown) that may be repositioned so as to switch that MOORAD between an on state and an off state. For example, each MOORAD 512, 516 may be an automated MOORAD like MOORAD 100 of FIGS. 1A-1D, MOORAD 300 of FIGS. 3A-3D or MOORAD 400 of FIGS. 4A and 4B, or may be a manually actuated MOORAD as shown. As shown, each MOORAD 512, 516 includes a lever 520, 524 operatively coupled to a rotatable magnet (not shown) so that the magnet may be rotated by pivoting the lever in a plane parallel to the plane of FIG. 5. In this example, the rotatable magnet could be, e.g., similar to either magnet 104 of FIGS. 1B and 1D or magnets 304A-B of FIGS. 3C and 3D, among others.

Figure 6A:
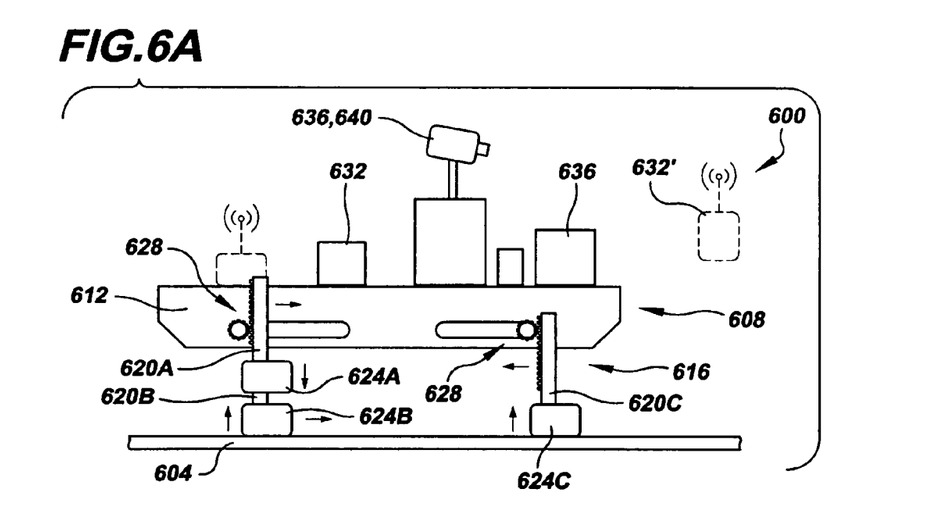
FIG. 6A is a side elevational view of a mobile apparatus of the present invention that includes a plurality of liftable MOORAD feet of the present invention.

FIG. 6A illustrates a mobile apparatus system 600 of the present invention suitable for traversing a ferromagnetic structure 604, or a portion thereof. System 600 generally includes a mobile apparatus 608 that broadly includes a chassis 612 and a mobility system 616 operatively attached to the chassis. In the present example, mobility system 616 includes four independently movable legs 620A-C (the view of the fourth leg (620D) is occluded by leg 620C), each comprising a MOORAD 624A-C (and 624D not shown), which may be, e.g., any one of MOORADs 100, 300, 400 discussed above in connection with FIGS. 1A-1D, 3A-3D, 4A and 4B. Those skilled in the art will appreciate that the number of legs 620 shown, i.e., four, is merely exemplary and that a mobile apparatus of the present invention may have any number of legs as few as two. Depending upon the overall mass of mobile apparatus 608 under consideration and other design considerations, e.g., coefficient of friction between each leg and the surface of the ferromagnetic structure, e.g., ferromagnetic structure 604, for which the mobile apparatus is designed, a mobile apparatus having only two legs may be readily made due to the relatively large holding power achievable with MOORADs of the present invention. That is, a single MOORAD can support the entire weight of the apparatus as well as resist the other forces that would be present, e.g., overturning moments and forces due to moving the other leg, while the other MOORAD is being repositioned. It is noted that the friction between each MOORAD 624 and ferromagnetic structure can be increased as needed by adding a suitable friction increaser (not shown), such as a viscoelastic material, knurls, etc., to the contact surface of that MOORAD.

Each leg 620 of mobile apparatus 608 may be linearly movable relative to chassis 612 using any suitable "horizontal" (relative to FIG. 6A) actuator (not shown). Optionally, each leg 620 may also be liftable relative to ferromagnetic structure 604 using a suitable "vertical actuator, such as the rack and pinion type actuator 628 shown. As those skilled in the art will appreciate, the horizontal actuators and vertical actuators 628 may each be any suitable type of actuator, such that it is not necessary to list all such actuator types. Providing this liftability feature may be desirable, e.g., when mobile apparatus 608 must be capable of traversing ferromagnetic structures (not shown) having uneven surfaces and/or obstacles that the mobile apparatus must step over or engage while traversing that structure. Consequently, motion of mobile apparatus may be achieved by controllably releasing the magnetic attraction of MOORADs 624 in concert with each other (i.e., by controllably turning the MOORADs off) and either sliding, or, alternatively, lifting and moving, each turned-off MOORAD to its next position, and then turning each just-moved MOORAD on to reestablish the magnetic attraction to ferromagnetic structure 604.

As those skilled in the art will appreciate, the coordination and control of moving legs 620 as needed for mobile apparatus 608 to traverse structure 604 may be achieved in any of a number of ways, including an on-board control system 632. Control system 632 may utilize input from one or more sensors, e.g., optical sensors, such as video cameras, ultrasonic sensors, force sensors 636 and position sensors, such as global positioning system (GPS) sensors, that the control system utilizes to control the movement of mobile apparatus 608. In alternative embodiments, a similar control system and/or similar sensors may be located off-board mobile apparatus 608. If an off-board control-system, e.g., off-board control system 632', is utilized, it may communicate with the horizontal actuators and vertical actuators 628 and other systems aboard mobile apparatus 608 using a wireless or wired telemetry link between the off-board and an onboard receiver/transceiver. It is noted that off-board control system 632' may be manual, e.g., one that includes various human input devices (not shown), such as, joysticks, buttons, etc., for controlling horizontal and vertical actuators and/or other systems aboard mobile apparatus, fully automated or a combination of manual and automated.

Chassis 612 may serve as a platform for virtually any type of system that is deployable as a mobile apparatus. For example, mobile apparatus 608 may be equipped with a remotely panning camera 640 that transmits video of structure and surrounding area to an observer via wireless telemetry system. Camera 640 may serve as both a means for inspection and, if needed, for tele-operation of mobile apparatus.

Applications of mobile system 600 and other MOORAD-based mobile systems of the present invention are many. In terms of monitoring and surveillance, such systems have applications to bridges, dams, pipelines, power stations, water towers, naval vessels, and any magnetic structures, large or small. Also, small mobile systems can be created which travel through building ductwork to provide video monitoring, and can incorporate the ability to deploy various sensors within the air handling systems to monitor for the release or presence of various chemical, biological, or nuclear (CBN) agents. Because MOORADs of the present invention require no power to maintain their states, they are an attractive solution to sensor deployment as well. Attaching sensors to a single MOORAD with remote transmission capabilities enables the deployment of a highly specialized sensor network throughout or within a structure. In this way, a mobile apparatus of the present invention, such as mobile apparatus 608 of FIG. 6A, can be utilized to disperse the sensor nodes to the key locations, and can be used to retrieve or reconfigure the sensor placement as needed. Large infrastructures can be monitored from a single location (which can be either on site or remote) while utilizing highly configurable and adaptable network configurations.

The application to galvanized steel ductwork is an extremely useful example of the benefits of a mobile system of the present invention, such as mobile system 600. Generally, these environments are far too constrictive and not nearly strong enough to permit a human to safely move throughout a duct system. Additionally, the length and complexity of the duct systems complicates the use of telescopic or tethered inspection and sensing systems. The light weight and tele-operation capabilities of a mobile system of the present invention make it ideally suited to such an application. Inspection of joints and fittings, observing fan and baffle operation, and blueprint generation or verification can all be carried out with ease. Also, a mobile apparatus of the present invention outfitted with an anemometry sensor can be used to determine flow rates through ducts, and can be used to track down problems with air circulation systems and mixing boxes.

Another example application of the present invention is for temporary site monitoring, such as a construction site. A MOORAD-equipped mobile apparatus of the present invention, e.g., mobile apparatus 608 of FIG. 6A, can climb to a high lookout location, and with wireless camera 640 can provide surveillance of the project, including incremental progress and construction practices. When the project is nearing completion, the mobile apparatus can simply walk back down the structure and move on to the next site. Utilizing the panning feature of camera 640 allows for surveillance of a very large area from a single location. Having multiple mobile apparatuses on a site allows for remote monitoring of a sizable area from a few key vantage points, which can be changed as necessary to accommodate varying observation requirements. The applications of this video-based monitoring are many. Project managers have instant access to the state of the project, and can document the timelines of progress and material deliveries. Similarly, a mobile system of the present invention can be used to monitor security at critical locations for short periods of time, such as large sporting events.

Figure 6B:
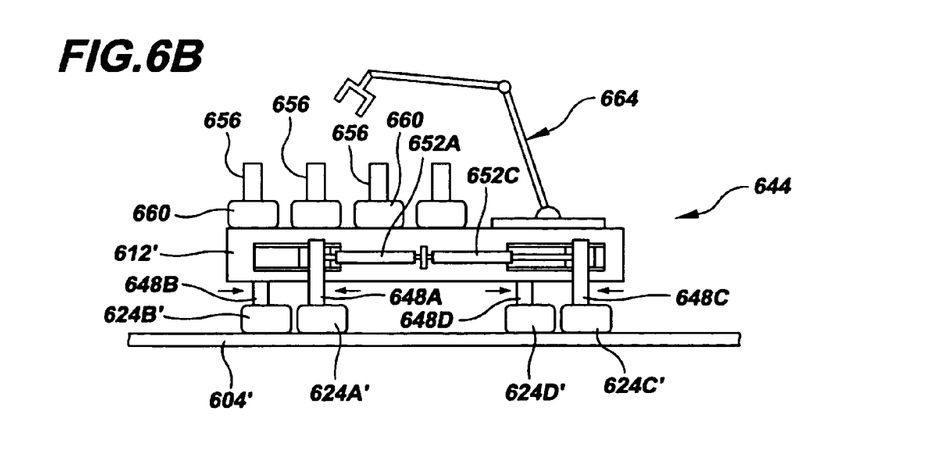
FIG. 6B is a side elevational view of another mobile apparatus of the present invention that includes a plurality of slidable MOORAD feet of the present invention.

FIG. 6B illustrates an alternative mobile apparatus 644 of the present invention. Mobile apparatus 644 is similar to mobile apparatus 608 of FIG. 6A, the primary differences illustrated being that legs 648A-D of mobile apparatus 644 of FIG. 6B being only slidable along ferromagnetic structure 604' and horizontal actuators 652A, 652C being particularly shown as linear actuators. Chassis 612' of mobile apparatus 644, as well as other features, e.g., MOORADs 624A'-D', may be the same as or similar to the corresponding features of mobile apparatus 608 of FIG. 6A. In general, mobile apparatus 644 may, in one respect, be considered to be less flexible in application than mobile apparatus 608 of FIG. 6A. In particular, since mobile apparatus 644 of FIG. 6B lacks the ability to lift each leg 648, the mobility of mobile apparatus 644 is limited to sliding. Consequently, mobile apparatus 644 of FIG. 6B would likely be unsuitable for traversing a ferromagnetic structure having significantly large surface features and/or obstacles that would require legs 648 to be lifted for successful traversal of the structure. Similar to mobile apparatus 608 of FIG. 6A, mobile apparatus 644 of FIG. 6B may be used as a platform for virtually any deployable system or device.

For example, mobile apparatus 644 of FIG. 6B may be used to deploy a sensor network (not shown) that utilizes a plurality of sensor nodes, each of which comprises a sensor device, e.g., any one of sensor devices 656. Utilizing sensor devices that also incorporate MOORADs of the present invention, e.g., sensor devices 656, 504, 508 of FIGS. 6B and/or 5, can provide an attractive solution to sensor deployment. Examples of sensors that can be incorporated into sensor devices 656 include, but are not limited to, video, audio, ultrasonic temperature, humidity, acceleration, strain, GPS, CBN detectors and miniature mass spectrometers. Mobile apparatus 644 may include a conventional manipulator arm 664, which may be used to deploy, retrieve and/or reconfigure as necessary, sensor devices 656 throughout a structure or region of interest. To deploy sensor devices 656, mobile apparatus 644, e.g., could simply climb or otherwise move to a desired location, place each sensor device and engage that device's MOORAD 660. The magnetic forces of each MOORAD 660 would cause it to grip the structure until mobile apparatus 644 comes back to deactivate the MOORAD and retrieve that sensor device 656.

Collecting data from a deployed sensor network can be accomplished through a variety of means, e.g., radio frequency (RF) communications. Utilizing RF transceivers (not shown), e.g., mobile apparatus 644 could communicate with individual nodal sensor devices (656) and sample data therefrom as needed. Bi-directional communications may be used to program sensor devices and to send data back on specific parameters of interest at specific time intervals. This type of system utilizes mobile apparatus 644 not only as a means for the deployment of sensor devices 656, but also as a central pipeline for the sensor data. Utilizing addressable RFID (radio frequency identification) type technology, many sensor devices 656 having their own unique addresses can be deployed, thereby allowing for a very large amount of data to be gathered in a highly organized and reliable fashion.

Figure 6C:
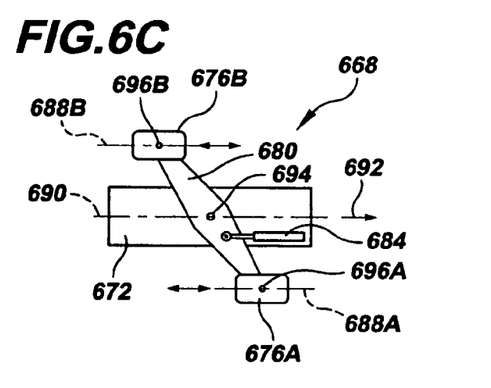
FIG. 6C is a bottom view of a bipedal mobile apparatus of the present invention that includes a single actuator for moving both MOORAD feet.

FIG. 6C shows a bipedal mobile apparatus 668 of the present invention that includes a chassis 672 and a pair of MOORADs 676A-B of the present invention attached to a double armature 680 at opposing ends thereof. Double armature 680 is pivotably attached to chassis 672 and is pivotable relative to the chassis using a suitable actuator, such as the linear actuator 684 shown. Each MOORAD 676A-B may be pivotably attached to double armature 680 in such a manner that the respective longitudinal central axis 688A-B of each MOORAD 676A-B remains substantially parallel to the longitudinal central axis 690 of chassis 672 as the double armature is pivoted relative to the chassis. This may be accomplished, e.g., using passive linkages (not shown) or active actuators (not shown) that are actuated based on input from sensors (not shown), e.g., rotational sensors that sense the relative rotations of double linkage 680 and MOORADs 676A-B.

In this embodiment, movement of mobile apparatus 668 "forward" i.e., in direction 692, may be accomplished by, e.g., actuating MOORAD 676A so that it is in its on state, actuating MOORAD 676B so that it is in its off state, actuating actuator 684 so as to pivot double armature 680 about its chassis pivot axis 694, which will also pivot the double armature about its MOORAD pivot axis 696A at the fixed MOORAD 676A so as to move chassis 672 and MOORAD 676B "forward," then actuating MOORAD 676B so that it is in its on state, actuating MOORAD 676A so that it is in its off state, actuating actuator 684 so as to pivot the double armature about its chassis pivot axis, which will also pivot the double armature about its MOORAD pivot axis 696B so as to move the chassis and MOORAD 676A "forward" and so on. Similar to chassis 612 of FIG. 6A, chassis 672 may be used for virtually any device or system that is deployable on a mobile platform.

Figure 7A:
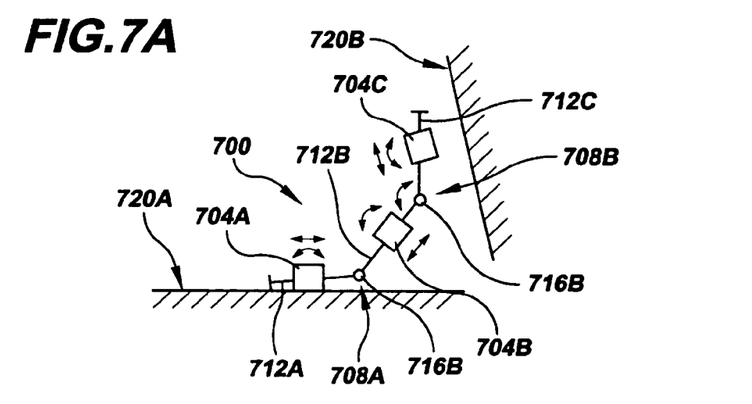
FIG. 7A is a side elevational view of yet another mobile apparatus of the present invention that includes an articulated chain of a plurality of uni-pedal MOORAD units of the present invention.

FIG. 7A shows a mobile apparatus 700 of the present invention comprising an articulated chain of MOORAD units 704A-C. Such an articulated chain may be used, e.g., to simulate the biological movement of a caterpillar, which can traverse discontinuous structures, e.g., a branch of a plant to the stem of a leaf located above the branch, with ease. Mobile apparatus 700 may be used for any purposes, such as any one of the purposes noted above relative to mobile apparatuses 608, 644 of FIGS. 6A and 6B, respectively. In mobile apparatus 700 of FIG. 7A, each MOORAD unit 704A-C may comprise a MOORAD of the present invention, such as any one of MOORADs 100, 300, 400 of FIGS. 1A-1D, 3A-3D, 4A and 4B. Immediately adjacent ones of MOORAD units 704A-C may be linked to one another by corresponding controllable articulated linkages 708A-B, which may include a plurality of links 712A-C coupled to each other by so-called "robotic wrists" 716A-B having three degrees of freedom. In addition, each MOORAD unit 704A-B is movable along the length of the corresponding link 712A-C and may also be pivotable about its corresponding link as shown so that the contact surface of that MOORAD unit may be made parallel to the corresponding surface of the ferromagnetic structure 720A-B to which it will attach. As will be readily appreciated, by coordinating the movements of robotic wrists 716A-B and MOORAD units 704A-C relative to their corresponding links in conjunction with controlling the on and off states of the MOORAD units in concert with one another and with the movements of the robotic wrists and movements of the MOORAD units, mobile apparatus 700 can be caused to traverse a variety of structures. Control algorithms for controlling the movement of mobile apparatus 700 in a coordinated manner will typically be somewhat complex, but well within the ordinary skill within the art.

Figure 7B:
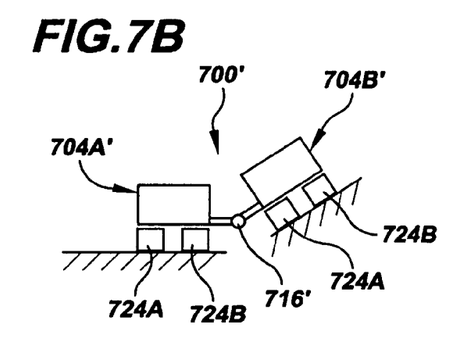
FIG. 7B is a side elevational view of and a further mobile apparatus of the present invention that includes an articulated chain of a plurality of multi-pedal MOORAD units of the present invention.

FIG. 7B illustrates an alternative articulated chain-type mobile apparatus 700' of the present invention. In this embodiment, instead of each MOORAD unit 704A'-B' being mono-pedal, i.e., have only a single MOORAD as in mobile apparatus 700 of FIG. 7A, each MOORAD unit is bipedal, i.e., includes two MOORAD. For example, each MOORAD unit 704A'-B' may be a bipedal mobile apparatus 668 of FIG. 6C. Of course, many other configurations for each bipedal MOORAD unit 704A'-B' are possible and will be within the ordinary skill in the art to make and use. It should also be apparent to those skilled in the art that one or both bipedal MOORAD units 704A'-B' may be replaced by another MOORAD unit having three or more MOORADs. For example, each bipedal MOORAD unit 704A'-B' may be replaced by either of the quadra-pedal mobile apparatuses 608, 644 of FIGS. 6A and 6B, respectively, if desired. As with mobile apparatus 700 of FIG. 7A, MOORAD units 704A'-B' of FIG. 7B are linked together by a controllable linkage, such as a three degree of freedom robotic wrist 716', as mentioned above. Mobile apparatus 700' may be moved by suitably controlling each bipedal MOORAD unit 704A'-B' in concert with one another and with wrists 716'.

Figure 8:
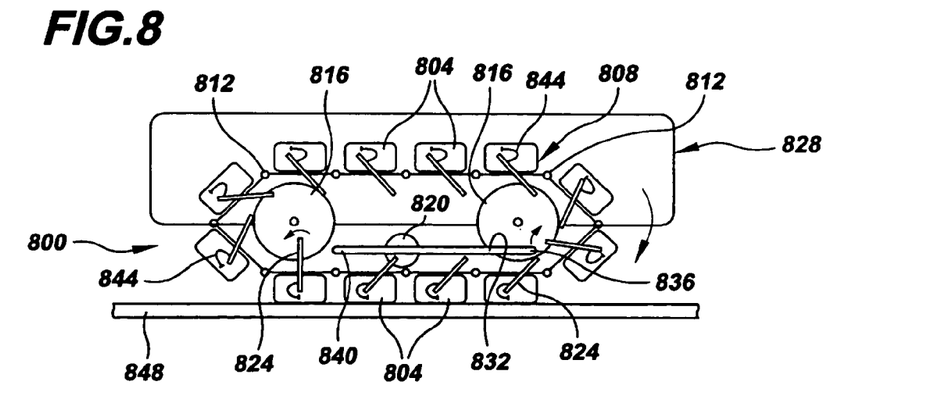
FIG. 8 is a side elevational view of a MOORAD-based belt mechanism of the present invention.

FIG. 8 illustrates a belt mechanism 800 of the present invention that includes a plurality of MOORADs 804 linked together to form a continuous belt 808. MOORADs 804 may be linked together in any of a variety of manners, such as by the hinge-type arrangement shown in which immediately adjacent ones of the MOORADs are connected together by hinges 812. In alternative embodiments, e.g., MOORADs 804 may be attached to a continuous flexible web (not shown). In all cases, however, regardless of whether the linkage is via a pinned hinge or a flexible web, the structure resulting from the plurality of MOORADs 804 so linked shall be considered a "belt." Belt 808 may be driven by one or more drive wheels 816 and include one or more idler wheels 820 as needed. Such drive and idler wheels 816, 820 are well known in the art.

Each MOORAD 804 may be either passively (shown) or actively switchable between its on and off states. To be considered "passively" switchable, a MOORAD, such as each MOORAD 804 must not be switched by an actuator onboard that MOORAD. In contrast a MOORAD will be considered to be "actively" switchable when both of its on and off states are switched by an onboard automated actuator, such as a linear actuator, servomotor, etc. In belt mechanism 800 of FIG. 8, it can be readily seen that MOORADs 804 are indeed passively switched, since each MOORAD includes a lever arm 824 that rotates a dipole magnet (not shown) inside that MOORAD into its on position as movement of the belt forces the lever arm against a stationary (relative to a body 828 with which belt mechanism 800 is typically engaged) switching structure 832. Consequently, the switching is not accomplished by any automated actuators onboard MOORADs 804, but rather by the interaction of lever arms 824 with switching structure 832 as belt 808 moves relative to the switching structure.

As belt 808 moves relative to switching structure 832, each lever arm 824 that has already engaged the leading end 836 of the switching structure remains engaged with the switching structure and remains in its on position until the lever arm reaches the trailing end 840 of the switching structure and thereafter disengages the switching structure. Each lever arm 824 is biased toward its off position, e.g., using a bias device, such as a spring, e.g., rotation spring 844, so that when each lever arm moves just past trailing end 840 of switching structure 832, the corresponding spring 844 moves that lever arm and the corresponding respective dipole magnet to their off position. In this manner, MOORADs 804 are individually turned on so as to be active substantially only when they are confronting a ferromagnetic structure 848, or, if the ferromagnetic structure is not yet present, when they are in their proper ferromagnetic structure confronting positions. Those skilled in the art will readily appreciate that switching structure 832 may be designed so that switching works in the opposite manner, i.e., the switching structure switches and holds MOORADs 804 in their off positions rather than their on positions. Those skilled in the art will easily understand the modifications necessary to implement this alternative.

It will be readily appreciated that a belt mechanism of the present invention, e.g., belt mechanism 800 of FIG. 8, may be used for a variety of purposes. For example, belt mechanism 800 may function as a track for a mobile apparatus. In this case, body 828 may be a chassis, generally similar to chasses 612, 612', 672 of FIGS. 6A-6C and ferromagnetic structure 848 would be a structure that it is desired that the mobile apparatus traverse. Alternatively, belt mechanism 800 may function as a conveyor belt, e.g., an overhead conveyor belt, in which case body 828 may be a conveyor belt support structure and ferromagnetic structure 848 would be a structure or object that is desired to be conveyed from one location to another.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A magnetic on-off attachment device, comprising:
   a) a first ferromagnetic portion;
   b) a second ferromagnetic portion;
   c) a magnetic insulator magnetically isolating said first ferromagnetic portion from said second ferromagnetic portion;
   d) a dipole magnet movable relative to each of said first and second ferromagnetic portions so as to provide the magnetic on-off attachment device with an on state in which the magnetic on-off attachment device has a maximum magnetic attraction to a ferromagnetic body that is not part of the magnetic on-off attachment device and with an off state in which the magnetic on-off attachment device has a minimum magnetic attraction to the ferromagnetic body; and
   e) an actuating mechanism operatively coupled to said dipole magnet so as to move said dipole magnet relative to each of said first and second ferromagnetic portions in response to an actuating signal so as to alternatingly switch the magnetic on-off attachment device between the on state and the off state.

2. A magnetic on-off attachment device according to claim 1, wherein said dipole magnet is linearly movable relative to said first and second ferromagnetic portions and said actuating mechanism is operatively configured to move said dipole magnet in a linear manner.

3. A magnetic on-off attachment device according to claim 1, wherein said first ferromagnetic portion is nested with said second ferromagnetic portion.

4. A magnetic on-off attachment device according to claim 1, wherein said dipole magnet is rotatably movable relative to said first and second ferromagnetic portions and said actuating mechanism is operatively configured to rotate said dipole magnet.

5. A magnetic on-off attachment device according to claim 1, wherein said actuating signal is an electrical signal.

6. A magnetic on-off attachment device according to claim 1, wherein said actuating signal is one of the following: an optical signal, a pneumatic signal, a hydraulic signal, a sonic signal and an ultrasonic signal.

7. A magnetic on-off attachment device according to claim 1, comprising a plurality of dipole magnets, each movable by said actuating mechanism.

8. A sensor system, comprising:
   a) at least one sensor operatively configured to convert one or more physical occurrences into a signal; and
   b) a magnetic on-off attachment device attached to said at least one sensor for releasably magnetically securing said at least one sensor to a ferromagnetic structure, said magnetic on-off attachment device including:
      i) a first ferromagnetic portion;
      ii) a second ferromagnetic portion;
      iii) a magnetic insulator magnetically isolating said first ferromagnetic portion from said second ferromagnetic portion;
      iv) a dipole magnet movable relative to each of said first and second ferromagnetic portions so as to provide the magnetic on-off attachment device with an on state in which the magnetic on-off attachment device has a magnetic attraction to a ferromagnetic body that is not part of the magnetic on-off attachment device and with an off state in which the magnetic on-off attachment device has substantially no magnetic attraction to the ferromagnetic body; and v) an actuating mechanism operatively coupled to said dipole magnet so as to move said dipole magnet relative to each of said first and second ferromagnetic portions so as to alternatingly switch said magnetic on-off attachment device between the on state and the off state.

9. A sensor system according to claim 8, wherein said actuating system is responsive to a control system.

10. A sensor system according to claim 8, wherein said dipole magnet is linearly movable relative to said first and second ferromagnetic portions and said actuating mechanism is operatively configured to move said dipole magnet in a linear manner.

11. A sensor system according to claim 8, wherein said dipole magnet is rotatably movable relative to said first and second ferromagnetic portions and said actuating mechanism is operatively configured to rotate said dipole magnet.

12. A sensor system according to claim 8, further comprising a mobile apparatus operatively configured to deploy said at least one sensor and said magnetic on-off attachment device from said mobile apparatus, said mobile apparatus comprising a mobility system that includes a plurality of magnetic on-off robotic attachment devices.

13. A sensor system according to claim 12, wherein said mobile apparatus is further configured to retrieve said sensor in combination with said magnetic on-off attachment device by turning off said magnetic on-off attachment device and moving said sensor in combination with said magnetic on-off attachment device from a location on the ferromagnetic structure to the mobile apparatus.

14. A sensor system according to claim 12, wherein said mobile apparatus is configured to deploy said sensor in combination with said magnetic on-off attachment device by moving said sensor in combination with said magnetic on-off attachment device from said mobile apparatus to a desired location on the ferromagnetic structure and turning on said magnetic on-off attachment device.

15. A sensor system according to claim 14, wherein said mobile apparatus is further configured to retrieve said sensor in combination with said magnetic on-off attachment device by turning off said magnetic on-off attachment device and moving said sensor in combination with said magnetic on-off attachment device from the location on the ferromagnetic structure to the mobile apparatus.

* * * * *